(12) United States Patent
Ciprian

(10) Patent No.: US 6,631,321 B1
(45) Date of Patent: Oct. 7, 2003

(54) VEHICLE HEADING CHANGE DETERMINATION USING COMPENSATED DIFFERENTIAL WHEEL SPEED

(75) Inventor: Joseph Ciprian, Bloomingdale, IL (US)

(73) Assignee: Navigation Technologies Corp., Chicago, IL (US)

( * ) Notice: Subject to any disclaimer, the term of this patent is extended or adjusted under 35 U.S.C. 154(b) by 95 days.

(21) Appl. No.: 10/055,497

(22) Filed: Oct. 29, 2001

(51) Int. Cl.$^7$ ............................................. G01C 21/00
(52) U.S. Cl. ..................... 701/207; 340/988; 340/990
(58) Field of Search ................................. 701/207, 208, 701/215, 216, 217, 224, 72, 75; 340/988, 990, 995; 342/451, 357.14, 357.13

(56) References Cited

U.S. PATENT DOCUMENTS

| | | | |
|---|---|---|---|
| 4,796,191 A | 1/1989 | Honey et al. | 701/217 |
| 4,807,127 A | 2/1989 | Tenmoku et al. | 701/207 |
| 4,814,989 A | 3/1989 | Dobereiner et al. | 701/210 |
| 4,964,052 A | 10/1990 | Ohe | 701/208 |
| 4,999,783 A | 3/1991 | Tenmoku et al. | 701/217 |
| 5,058,023 A | 10/1991 | Kozikaro | 701/217 |
| 5,119,301 A | 6/1992 | Shimizu et al. | 701/217 |
| 5,155,688 A | 10/1992 | Tanaka et al. | 701/217 |
| 5,311,173 A | 5/1994 | Komura et al. | 340/995 |
| 5,311,195 A | 5/1994 | Mathis et al. | 342/357.14 |
| 5,334,986 A | 8/1994 | Fernhout | 342/357.14 |
| 5,359,529 A | 10/1994 | Snider | 701/210 |
| 5,374,933 A | 12/1994 | Kao | 342/357.13 |
| 5,422,639 A | 6/1995 | Kobayashi et al. | 340/988 |
| 5,422,815 A | 6/1995 | Hijikata | 701/208 |
| 5,428,545 A | 6/1995 | Maegawa et al. | 701/210 |
| 5,483,456 A | 1/1996 | Kuwahara et al. | 701/215 |
| 5,493,294 A | 2/1996 | Morita | 340/988 |
| 5,508,931 A | 4/1996 | Snider | 701/207 |
| 5,523,765 A | 6/1996 | Ichikawa | 342/451 |
| 5,552,990 A | 9/1996 | Ihara et al. | 701/208 |
| 5,852,791 A | 12/1998 | Sato et al. | 701/217 |
| 5,912,635 A | 6/1999 | Oshizawa et al. | 340/988 |
| 5,995,897 A * | 11/1999 | Oshiro et al. | 701/72 |
| 6,041,280 A | 3/2000 | Kohli et al. | 701/201 |
| 6,167,347 A | 12/2000 | Lin | 701/214 |
| 6,192,312 B1 | 2/2001 | Hummelsheim | 701/118 |
| 6,230,100 B1 * | 5/2001 | Geier | 701/216 |
| 6,360,165 B1 | 3/2002 | Chowdhary | 701/205 |

FOREIGN PATENT DOCUMENTS

WO     WO 00/50917     8/2000

* cited by examiner

Primary Examiner—Marthe Y. Marc-Coleman
(74) Attorney, Agent, or Firm—Frank J. Kozak; Jon D. Shutter; Lawrence M. Kaplan

(57) ABSTRACT

A vehicle positioning application in a navigation system provides for determining a change of vehicle heading using differential wheel speed sensors and compensates for dynamic and static changes in the wheel radii.

15 Claims, 4 Drawing Sheets

Before Inter-wheel learning

After Inter-wheel learning

VEHICLE HEADING CHANGE DETERMINATION USING COMPENSATED DIFFERENTIAL WHEEL SPEED

REFERENCE TO RELATED APPLICATIONS

The present application is related to the U.S. Pat. No. 6,192,312 entitled "POSITION DETERMINING PROGRAM AND METHOD," and the U.S. Pat. No. 6,317,683 entitled "VEHICLE POSITIONING USING THREE METRICS," the entire disclosures of which are incorporated by reference herein.

BACKGROUND OF THE INVENTION

The present invention relates generally to a vehicle navigation system that has the capability to determine in real time the position of the vehicle relative to data contained in a database that represents the road network on which the vehicle is traveling. The present invention more particularly relates to programs and methods that improve vehicle positioning accuracy when using differential wheel sensors with a vehicle navigation system.

In-vehicle navigation systems provide a variety of useful features to end users (i.e., the drivers and/or passengers of the vehicles in which the navigation systems are installed). Included among the features that are provided by some in-vehicle navigation systems are route calculation, route guidance, emergency roadside services, electronic yellow pages, and so on. In order to provide these kinds of features, in-vehicle navigation systems use geographic data. The geographic data include information about features in a covered geographic region. The geographic data include information about the location of roads, the speed limits along roads, turn restrictions at intersections, the names of roads, the address ranges along roads, the locations of points of interest, and so on.

Some of the features provided by in-vehicle navigation systems require that the position of the vehicle be determined. There are several considerations related to determining the position of the vehicle. For example, a GPS (Global Positioning System) may be used to obtain the geographic coordinates of the vehicle. However, the geographic coordinates only indicate the position of the vehicle relative to the surface of the earth. For some of the features provided by in-vehicle navigation systems, a means is required to determine the vehicle position relative to the road network on which the vehicle is traveling and the direction of the vehicle along the road segment. In order to determine the position and heading of a vehicle along a road segment, a vehicle navigation system uses a geographic database and one or more sensors in addition to the GPS system.

One type of sensor that can be used in a vehicle navigation system to determine the vehicle position or heading is a differential wheel speed sensor. A differential wheel speed sensor can be used to determine changes in vehicle heading by comparing the distances traveled by a left and right wheel of the vehicle. Once the vehicle position is determined relative to the road segment represented by the geographic database, programming in the in-vehicle navigation system can be used to provide various features, such as determining a route to a desired destination, providing maneuvering instructions for reaching the destination, identifying the closest restaurant or gas station relative to the vehicle position, displaying a map of the area around the vehicle, and so on.

An advantage associated with using differential wheel speed sensors in navigation systems is that they are relatively inexpensive. Although differential wheel speed sensors are relatively accurate, there is room for improvement. Accordingly, it is an objective to improve the accuracy of vehicle heading determinations when using differential wheel speed sensors.

SUMMARY OF THE INVENTION

To provide improvements over the prior art, a vehicle positioning application is disclosed that includes a means for a differential wheel speed (DWS) heading change determination (hereinafter sometimes referred to as "DWS heading") and means for correcting the DWS heading determination to account for changes in wheel radii. The DWS heading may then be used to correct the vehicle heading determination in certain embodiments.

Each of the various corrective aspects according to the exemplary embodiments of the present invention may be instituted as various software, firmware, or other processing routines in any desirable processor of the vehicle or its navigation system components utilizing the data gathered from a DWS sensor system as set forth herein or otherwise modified according to accepted techniques in the art.

DETAILED DESCRIPTION OF THE PRESENTLY PREFERRED EMBODIMENTS

Figure 1:
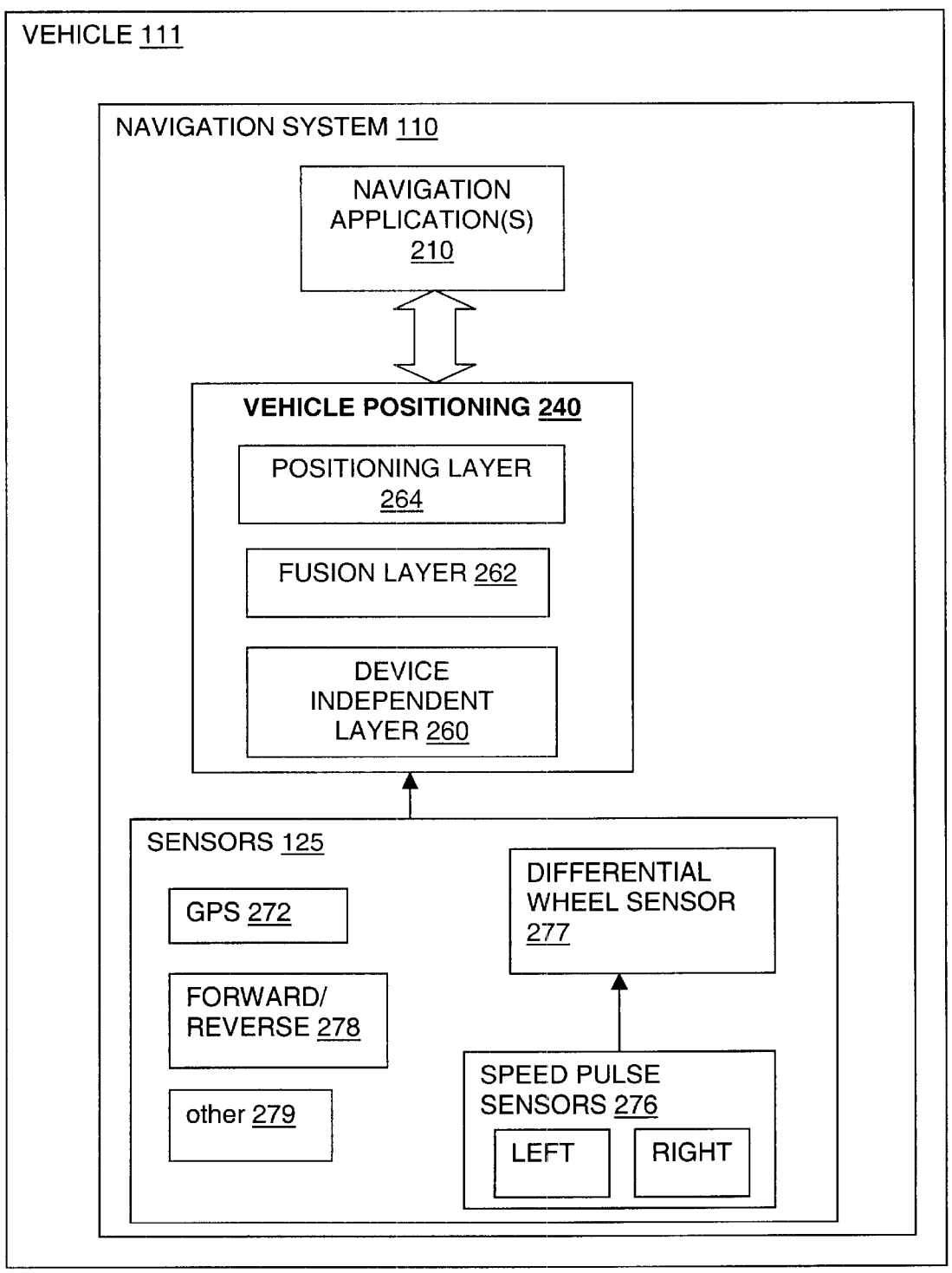
FIG. 1 is a schematic diagram illustrating a vehicle with a navigation system.

Referencing FIG. 1, there is shown a block diagram of a vehicle 111 having a navigation system 110. The navigation system 110 has a navigation application 210 accepting inputs from a vehicle positioning application 240. The vehicle positioning application 240 uses the outputs of sensors 125. The sensors 125 include a GPS receiver 272, speed pulse sensors 276, a differential wheel speed sensor 277 and a forward/reverse sensor 278. The vehicle positioning application 240 may use the outputs of additional sensors 279.

The outputs of the sensors 125 may be affected by many variable factors, such as the ambient temperature, the age of the sensor, and the stability of the power supply as well as other factors that are difficult or impossible to control. Accordingly, the vehicle positioning application 240 generally treats sensor measurements as approximations to be weighted according to confidence factors.

The GPS (Global Positioning System) receiver 272 on board the vehicle 111 uses signals from a constellation of a plurality of satellites to compute the position of the GPS receiver 272 relative to the earth. The GPS satellites transmit signals on different frequencies which are received by the GPS receiver 272. The position calculated by the GPS receiver 272 is an estimate of the true position on the earth. The calculated position may be in error or inaccurate due to such factors as multipath interference, atmospheric distortion, and so on. GPS is used as one sensor to calculate absolute wheel radii, distance, and heading as known by various techniques in the art.

Each speed pulse sensor 276 is a type of sensor used to indicate the distance traveled by the vehicle 111. The speed pulse sensor 276 outputs a number of speed pulses per wheel rotation, using a sensor responsive to wheel rotation, such as for example, a permanent magnet Hall effect sensor, Wiegand effect sensor, an optical sensor, or other type of sensor, located at the wheel rim. The number of pulses reported by this sensor is proportional to the distance traveled by the vehicle 111. This value can be used to compute the speed of the vehicle 111 according to distance traveled in a given time, as known in the art. However, as noted, correction factors may need to be applied.

According to one embodiment herein, heading changes are measured, or calculated, by the DWS sensor 277. The DWS sensor 277 takes wheel speed sensor reports from a paired left wheel and right wheel, e.g. the front wheels or the back wheels, and uses the paired wheel speed sensor reports to calculate the change in heading of the vehicle. As will be understood by a person of skill in the art, the use of an accurate, non-lossy, DWS sensor may be important for utilization of the navigation system when the vehicle is traveling at low speeds, e.g., under 25 mph. In using the wheel speed sensors for DWS determinations, it is desirable that, regardless of the type of sensor used, the sensor output should be linear and should exhibit no loss of output regardless of the speed of the wheel.

Figure 2:
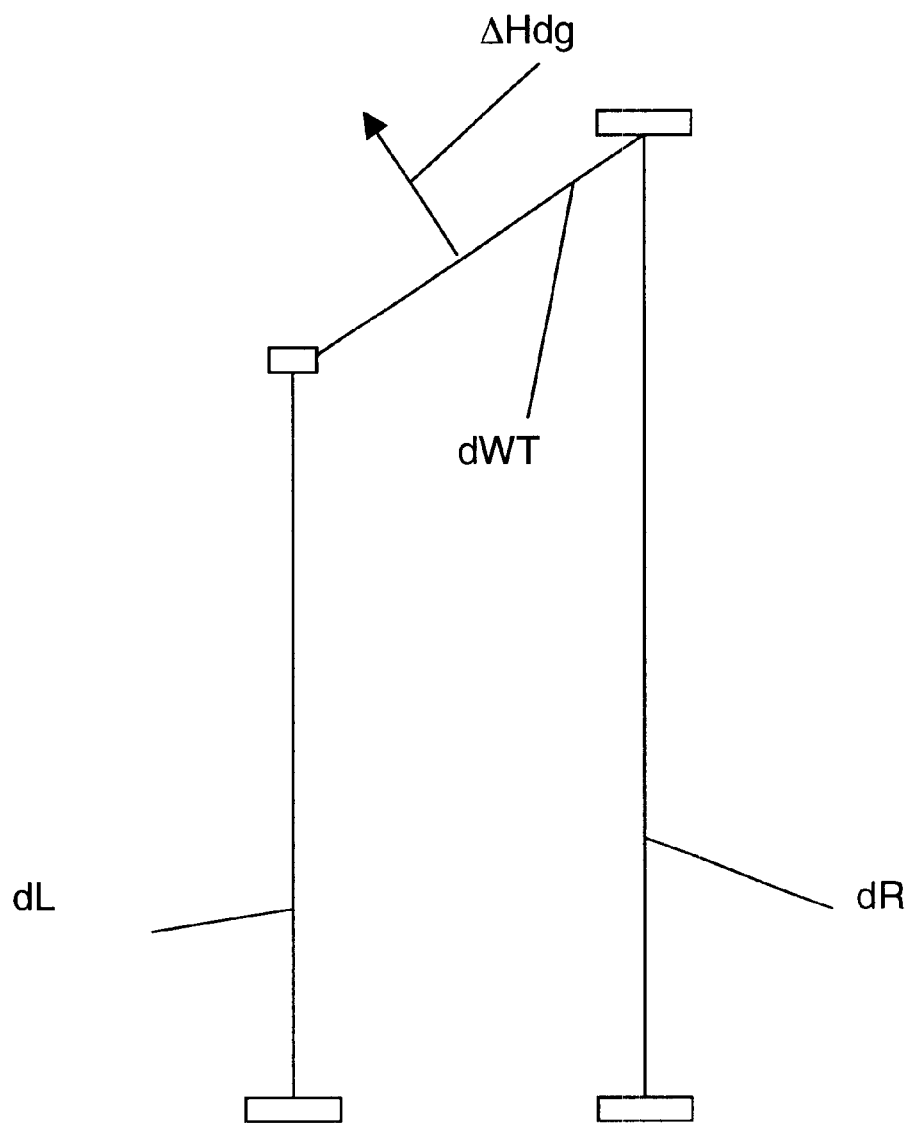
FIG. 2 is a diagram illustrating a DWS heading calculation.

Referencing FIG. 2, the basic theory behind using DWS to determine vehicle heading is known to those in the art. Essentially, each wheel of a left and right opposing pair of wheels has traveled a different distance, and this distance can be used to determine a change of heading value using the following formula:

$$\Delta Hdg = (dL - dR)/dWT \tag{1}$$

where:

dL is distance traveled as input from, or reported by, the left wheel sensor, dR is distance traveled as input from, or reported, by the right wheel sensor, and dWT is the distance between the left wheel and the right wheel, sometimes called the "Wheel Track".

However, vehicle tires undergo changes of radii due to both static and dynamic factors. Dynamic factors include high-speed driving and lateral acceleration, such as through an on-ramp to a highway, with the forces involved decreasing the radius of the outside tire and increasing the radius of the inside tire.

Also, the vehicle wheel radius may change statically due to adding or removing weight from the vehicle, inflation or deflation of the tires, etc., thereby causing non-uniform changes in the wheel radius. Use of the DWS heading by the vehicle positioning application 240 would desirably account for both static and dynamic changes of wheel radii.

One present embodiment includes techniques to correct the effects of wheel radius changes on the differential wheel speed (DWS) heading change determination of a vehicle positioning application for an in-vehicle navigation system. The wheel radius determination can be important in determining the DWS heading change with sufficient accuracy. The modeling of the effects imparted to the DWS heading determination by changing wheel radii can also be important when using a vehicle positioning application so that the DWS heading can be realistically weighted as a factor in correcting, or determining the confidence of, the vehicle position determination when compared to all sensor system calculations of the vehicle positioning application.

Wheel Radius Dynamic Change Factors

The effects of lateral acceleration on the vehicle wheel radii may cause up to approximately a 30% heading error for a vehicle traveling through an on or off ramp maneuver. The lateral acceleration involved causes a force on the outside tire causing the outer wheel's radius to compress. Likewise, the force causes the inner wheel's radius to increase.

The overall effect of wheel radius changes on the heading change determination of the navigation system can be decreased by using the following factor to compensate:

$$alat * Dist * Kcar;$$

where alat is an estimated lateral acceleration value;

Dist is the distance traveled at the lateral acceleration as taken from the wheel speed sensors; and Kcar is a vehicle dependent constant.

In the above formula, the estimated lateral acceleration value, alat, can be determined by multiplying the estimated yaw rate by the vehicle speed. DWS data can be used to estimate the yaw rate, or heading change, by using the formula dl–dr/dWT. Vehicle speed can be estimated using the wheel speed sensor data.

The Kcar factor can be dependent on the individual vehicle characteristics including center of gravity of the vehicle, stiffness of tires, overall weight of the vehicle, and suspension characteristics. For each turn, the Kcar factor can be learned according to the below formula.

A turn detection algorithm, described in the above referenced U.S. Pat. No. 6,317,683, can be used to trigger a relearning or recalculation of the Kcar factor each time the vehicle goes through a detected turn. The referenced turn detection algorithm operates by detecting changes of DWS heading over a preselected number of degrees and comparing a presumed turn to data acquired from the GPS data stream. If the GPS heading is not available at the beginning or end of the turn, or is not deemed reliable due to inappropriate conditions, such as in the instance where the vehicle is not traveling at a sufficient speed to trust the GPS, e.g., greater than 25 mph, or the GPS heading value does not match the detected turn, then turn detection is not used, resulting in no Kcar update value.

To account for the effects of the lateral acceleration on the wheel radius, the following formula can be used.

$$\Delta HdgDWS = (dL-dR)/dWT - Kcar(\text{old}) * abs(Dist * alat) \tag{2}$$

i.e., change in DWS heading equals DWS heading value minus a correction factor of car characteristics times lateral acceleration factors.

The updated Kcar factor can be calculated (for each detected turn) according to the following formula:

$$\Delta Hdg = \Delta HdgDWS - Kcarchange * (SUM(alat * Dist)) \tag{3}$$

or as rewritten to account for Equation 2:

$$\Delta Hdg = ((dL-dR)/dWT - Kcar(\text{old}) * abs(Dist * alat)) - Kcarchange * SUM(alat * Dist); \tag{4}$$

or $$Kcarchange = (((dL-dR)/dWT - Kcar(\text{old}) * abs(Dist * alat)) - \Delta Hdg)/SUM(alat * Dist) \tag{5}$$

and $$Kcarupdated(\text{which becomes } Kcarold \text{ of formula 1}) = Kcarold(\text{known}) - Kcarchange(\text{calculated}) \tag{6}$$

where abs(Dist*alat) is the absolute value of distance through the turn times alat;

SUM(alat*Dist) is the piecewise summation of the absolute (lateral acceleration*Distance) computations (e.g., done at 1/second) during the turn;

ΔHdg is the change of heading value from ΔHdgGPS value used by the vehicle positioning application from beginning to end of turn due to the high confidence value placed on GPS values under appropriate conditions; and ΔHdgDWS is the change of heading value to the heading change calculated using DWS sensors.

It is noted that dL−dR can be derived from reported values, dWT is a known value, Kcar (old) is a known, i.e., previously learned value, alat can be an estimated value derived from the vehicle speed and heading sensors, and Dist can be a measured value from the vehicle sensors. Due to some inexact value estimates taken from raw sensor data in the learning of the Kcar factor, the Kcar factor retains some potential error in the heading change. This error can be further modeled to add further compensation for this error. Error modeling can be accomplished in the vehicle positioning application using a percentage of the magnitude of the lateral acceleration (alat)*distance (Dist) to determine the error in the computed heading change.

It will be appreciated that the above calculations may be done by a variety of means known in the art within any convenient processor layer or layers of the vehicle navigation system.

Wheel Radius Static Change Factors

As stated above, adding and removing weight from the vehicle or tire inflation/deflation may cause non-uniform changes in the wheel radius. For example, if the left wheel is inflated by 3 psi, the wheel radius may change by about 0.1%. For a vehicle with a wheel track of 1.5 meters, a bias of 4 degrees may be introduced for every 100 meters traveled. It would be preferable to reduce this amount.

Therefore, it may be desirable to adjust wheel radius learning, and provide filtering of the calculations to account for static non-uniform radius changes based on these static change of radius factors. In one embodiment disclosed herein, in order to adjust to situations which cause non-uniform wheel radius changes, a short term learning algorithm is implemented to help more quickly learn non-uniform radius changes. This short-term algorithm has the advantage of eliminating, or reducing, the error bias when adding weight to a vehicle or when inflating tires.

Figure 3:
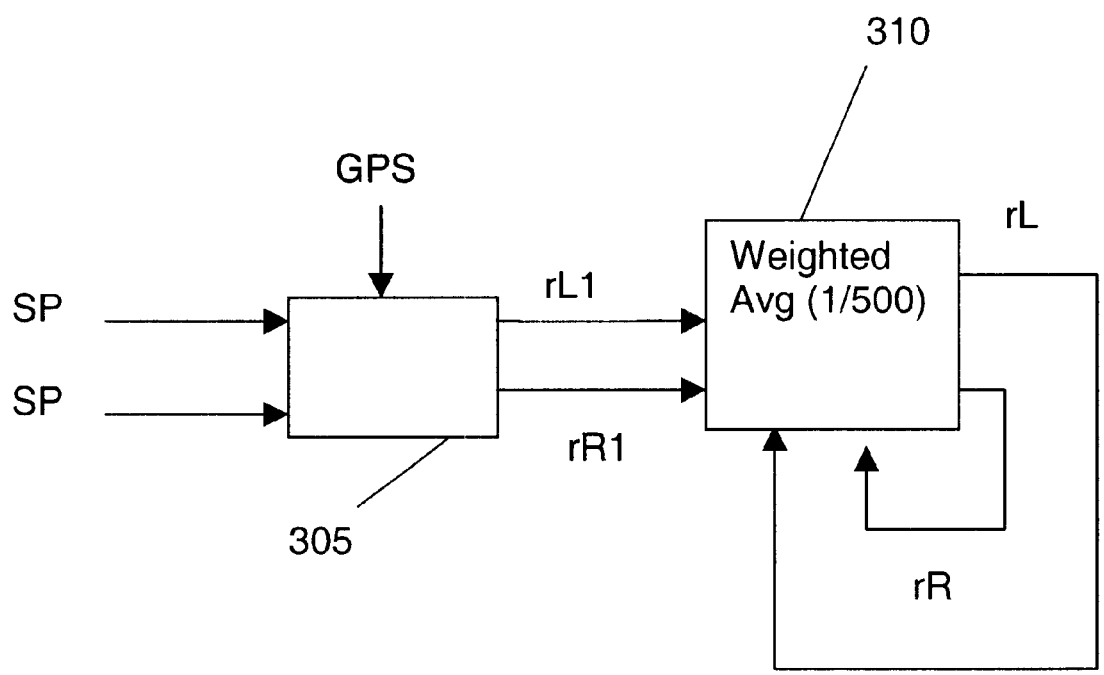
FIG. 3 is a block diagram illustrating known initial wheel radius learning with a long term, low-weighted correction factor.

Referring to FIG. 3, a block diagram of the initial wheel radius learning is shown. Inputs from the left and right speed pulse sensors (the components of the DWS sensor) SPL, SPR, and position information from the GPS sensor are entered to a data sample radius calculation operation 305. In order to filter out instances where the GPS based wheel radius calculation values rL1, rR1 may be wrong, a known wheel radius learning calculation operation 310 only weighs each new sample of the GPS wheel radius calculation by 1/500. Noting that GPS position acquisition time may be on the order of thirty seconds to three minutes, this has the effect of taking a relatively long time to learn inter-wheel radius changes. In order to adjust the inter-wheel differential radius error for use with the disclosed embodiment, a short-term learning mechanism is introduced.

Figure 4:
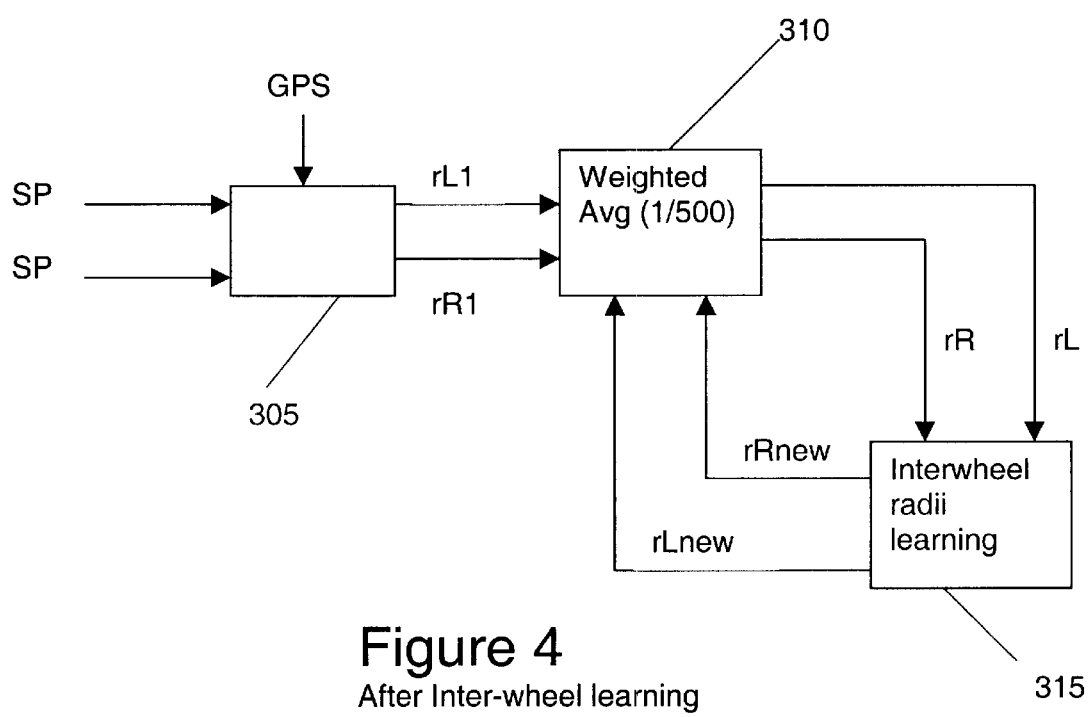
FIG. 4 is a block diagram illustrating initial wheel radius learning with a long term, low weighted correction factor as adjusted by a short term, high weighted correction factor.

Referring to FIG. 4, an exemplary embodiment recognizes that it can be useful to correct for wheel radii changes in the short term by figuring the differential of the paired-wheel radii according to the DWS sensors, as at DWS radii calculation operation 315, rather than relying on the absolute values of each wheel radius calculated using GPS speed calculations as at 305. The differential radii calculation operation 315 can be performed to obtain values which are operably accurate and obtained from a data stream sampled more quickly than the GPS. For example, the inter-wheel radii may be sampled at once per second, yielding far greater sampling rates and new values rLnew, rRnew to update the long term, low weighted calculation operation 310 thus obtaining operable radii values within about one minute. Further, the short term differential radius learning taken from the DWS sensors is more likely to be uninterrupted and reliably reported without dependence on receiving the GPS signal. The short term algorithm correction takes advantage of the knowledge that the major error source in the radii learning is biased by the GPS errors. However, both the left and right wheel radii learning are biased substantially equally by these errors. Therefore the differential value between the left wheel and the right wheel remains substantially valid.

According to some embodiments of the short term static wheel differential radius correction, the inter-wheel radii differential correction can be continuously performed. A weighting to reduce the difference between the newly calculated, or reported, wheel differential and the previous wheel differential can then be performed. To avoid situations where the inter-wheel radius differential is incorrectly reported, the short-term learning is not overly aggressive in its correction of the previous value. Further, the short term learning may include outlier detection and filtering of each radius sampling, according to known techniques, to ensure that the newly learned wheel radii differential is accurate. The newly calculated wheel radii differential is only calculated from selected series of samples if the variances of the samples are low and no outliers are detected.

If the short-term learning indicates the present inter-wheel radius differential value is wrong, the inter-wheel radius differential will be changed by half wherein each wheel radius value is adjusted by one quarter of the apparent error. The short-term learning can help the navigation system learn the inter-wheel radius differential much faster than absolute radii calculations utilizing GPS, thereby reducing the heading errors and enabling the DWS heading calculations to be implemented in a workable navigation system. The values given in the examples herein are, of course, dependent upon the overall weighting which the differential radii calculation may be given to maintain an acceptable level of accuracy or confidence in the radii value.

For example, a formula for inter-wheel radii learning as used in the system illustrated by FIG. 4, is set forth as follows:

$$dr=rL-rR$$

or: the inter-wheel radius differential value equals the left wheel radius minus the right wheel radius.

An updated, or new, inter-wheel radius differential value, drnew, is calculated according to:

$$drnew=\text{Average }(dr)$$

where the average can be based on a given number (e.g., 5–10) of samples.

The drnew value will only be used if the variance of the samples is low and no outliers are detected, thereby indicating that the drnew value is valid. Then,if drnew is VALID
AND (drnew−drold)/drold) >0.025%)
Adjust the left and right radii by ¼ each
therefore,
rLnew=rL−(dr(new)−dr(old))/4; and
rRnew=rR+(dr(new)−dr(old))/4

In the embodiments disclosed above, a vehicle position may determined relative to data in a geographic database. The vehicle may be a pneumatically tired car, truck, bus, tricycle, or any other kind of vehicle with varying radii left/right opposing wheels that can travel along roads.

As mentioned above, an embodiment of the DWS heading change determinations for a vehicle positioning program can be used in a navigation system that is similar to the system described in U.S. Pat. No. 6,317,683. However, the DWS heading change determination programming disclosed in the present specification is not limited to use only in a system like the one described in U.S. Pat. No. 6,317,683.

It is intended that the foregoing detailed description be regarded as illustrative rather than limiting and that it is understood that the following claims including all equivalents are intended to define the scope of the invention.

I claim:

1. A method of compensating for differential wheel speed (DWS) heading determination errors in a navigation system for a vehicle, comprising:
   a) calculating a heading change value according to a DWS formula of: (dL−dR)/dWT; where:
      dL is distance traveled as derived from a left wheel sensor,
      dR is distance traveled as derived from a right wheel sensor, and
      dWT is the wheel track distance between the left wheel and the right wheel; and
   b) compensating for wheel radii change induced error in the heading change value according to the DWS formula by factoring in lateral acceleration, distance through a turn, and a vehicle constant for the course of the vehicle during the heading change.

2. The method according to claim 1 further comprising: deriving the vehicle constant by the formula:

−ΔHdgDWS/abs(Dist*alat)*((dL−dR)/dWT)=Kcar;

where:
   Kcar is the vehicle constant;
   ΔHdgDWS is a change of heading value to the heading change derived from DWS sensors; and
   abs(Dist*alat) is an absolute value of distance through the turn times alat.

3. The method according to claim 2 further comprising: recalculating the vehicle constant after each detected turn.

4. The method according to claim 3 further comprising: updating the vehicle constant at each detected turn by the formula:

Kcarchange=(((dL−dR)/dWT−Kcar(old)*abs(Dist*alat))−ΔHdg)/SUM(alat*Dist);

where:
   alat is an estimated lateral acceleration value;
   Dist is a distance traveled through the turn as derived from the wheel speed sensors;
   abs(Dist*alat) is an absolute value of distance through the turn times alat;
   SUM(alat*Dist) is a piecewise summation of the absolute (lateral acceleration*Distance) computations during the turn;
   ΔHdg is a change of heading value as dervied from a GPS sensor; and
   ΔHdgDWS is a change of heading value to the heading change derived from DWS sensors; and
   Kcar is the previous vehicle constant and Kcarchange is the updated vehicle constant subtracted therefrom to derive the new vehicle constant.

5. The method according to claim 4 further comprising: deriving an estimated lateral acceleration by multiplying yaw rate times speed through the turn.

6. The method according to claim 5 wherein the yaw rate is determined by the heading change and vehicle speed as derived from wheel speed sensor data.

7. The method according to claim 1 further comprising: detecting that the vehicle has made a turn to trigger the compensating for wheel radii change induced error in the heading change value.

8. A method of compensating for differential wheel speed heading determination errors in a vehicle navigation system, comprising:
   a) instituting a long term, low weighted correction algorithm for a first heading change value; and
   b) correcting the long term, low weighted correction algorithm with a short term, high weighted correction value derived from an inter-wheel differential radius measurement sample between a left wheel and right wheel opposing wheel pair;
   wherein said short term, high weighted correction value is derived according to the formula:
   dr=rL−rR;
   where: dr is the inter-wheel radius differential value, rL is the left wheel radius and rR is the right wheel radius, and
   calculating an updated, or new, inter-wheel radius differential value, drnew, according to:
   drnew=Average (dr);
   where: the average is based on a number of samples, and further adjusting each of the left and right radii by a selected weight whereby,
   rLnew=rL−(dr(new)−dr(old))/selected weight, and
   rRnew=rR+(dr(new)−dr(old))/selected weight.

9. The method according to claim 8 further comprising: deriving the first heading change value from a GPS sensor.

10. The method according to claim 8 further comprising: deriving the inter-wheel radius differential from a speed pulse sensor on each of the left wheel and right wheel of the opposing wheel pair.

11. The method according to claim 8 wherein the selected weight is four.

12. The method according to claim 8 further comprising: using the drnew value only if the variance among the measurement samples is within a predetermined range and no outliers are detected, thereby indicating that the drnew value is valid.

13. The method according to claim 12 further comprising adjusting the inter-wheel radius value only if (drew−drold)/drold)>0.025%).

14. The method according to claim 8 further comprising adjusting the inter-wheel radius value only if (drew−drold)/drold)>0.025%).

15. The method according to claim 8 further comprising adjusting the inter-wheel radius value only if (drew−drold)/drold) exceeds a preselected percent value.

* * * * *